(12) United States Patent
Ito et al.

(10) Patent No.: US 8,514,526 B2
(45) Date of Patent: Aug. 20, 2013

(54) MAGNETORESISTIVE MAGNETIC HEAD HAVING A NON-MAGNETIC PART ON A MEDIUM FACING SURFACE SIDE OF THE SENSOR

(75) Inventors: Naoto Ito, Fujisawa (JP); Kaori Suzuki, Fujisawa (JP)

(73) Assignee: HGST Netherlands B.V., Amsterdam (NL)

( * ) Notice: Subject to any disclaimer, the term of this patent is extended or adjusted under 35 U.S.C. 154(b) by 280 days.

(21) Appl. No.: 12/904,954

(22) Filed: Oct. 14, 2010

(65) Prior Publication Data

US 2011/0085261 A1 Apr. 14, 2011

(30) Foreign Application Priority Data

Oct. 14, 2009 (JP) .................. 2009-237296

(51) Int. Cl.
*G11B 5/39* (2006.01)
(52) U.S. Cl.
USPC .......................................... 360/319
(58) Field of Classification Search
USPC .......................................... 360/319
See application file for complete search history.

(56) References Cited

U.S. PATENT DOCUMENTS

| 5,583,726 | A | | 12/1996 | Mizoshita et al. | |
|---|---|---|---|---|---|
| 6,396,670 | B1 | * | 5/2002 | Murdock | 360/319 |
| 6,510,030 | B1 | * | 1/2003 | Song et al. | 360/319 |
| 6,665,152 | B2 | * | 12/2003 | Nemoto | 360/319 |
| 6,738,233 | B2 | * | 5/2004 | Khizroev et al. | 360/319 |
| 7,140,094 | B2 | * | 11/2006 | Nemoto | 29/603.14 |
| 2003/0048584 | A1 | * | 3/2003 | Song et al. | 360/319 |

FOREIGN PATENT DOCUMENTS

| JP | 05/114119 | A | | 5/1993 |
|---|---|---|---|---|
| JP | 07287817 | A | * | 10/1995 |
| JP | 10222819 | A | * | 8/1998 |
| JP | 10334418 | A | * | 12/1998 |
| JP | 11316916 | A | * | 11/1999 |
| JP | 2003/077107 | | | 3/2003 |
| JP | 2007172669 | A | * | 7/2007 |
| JP | 2007305215 | A | * | 11/2007 |

* cited by examiner

*Primary Examiner* — Will J Klimowicz
(74) *Attorney, Agent, or Firm* — Zilka-Kotab, PC

(57) ABSTRACT

According to one embodiment, a magnetic head includes an upper magnetic shield, a lower magnetic shield, a magnetoresistive element having a magnetization-free layer formed therein formed between the shields, an upper magnetic shield restricting part formed on a medium facing surface side, a lower magnetic shield restricting part formed on the medium facing surface side, and a non-magnetic part formed between the upper and lower magnetic shield restricting parts on the medium facing surface side such that the magnetoresistive element is not exposed at the medium facing surface. The non-magnetic part is positioned such that a distance between the upper and lower magnetic shield restricting parts in a direction perpendicular to a plane of deposition is smaller than a distance between the upper and lower magnetic shields in the direction perpendicular to the plane of deposition near the medium facing surface. Other systems and heads are disclosed as well.

20 Claims, 7 Drawing Sheets

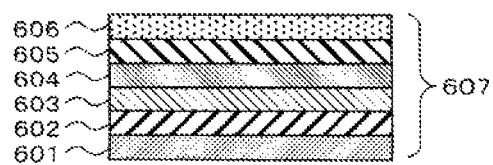
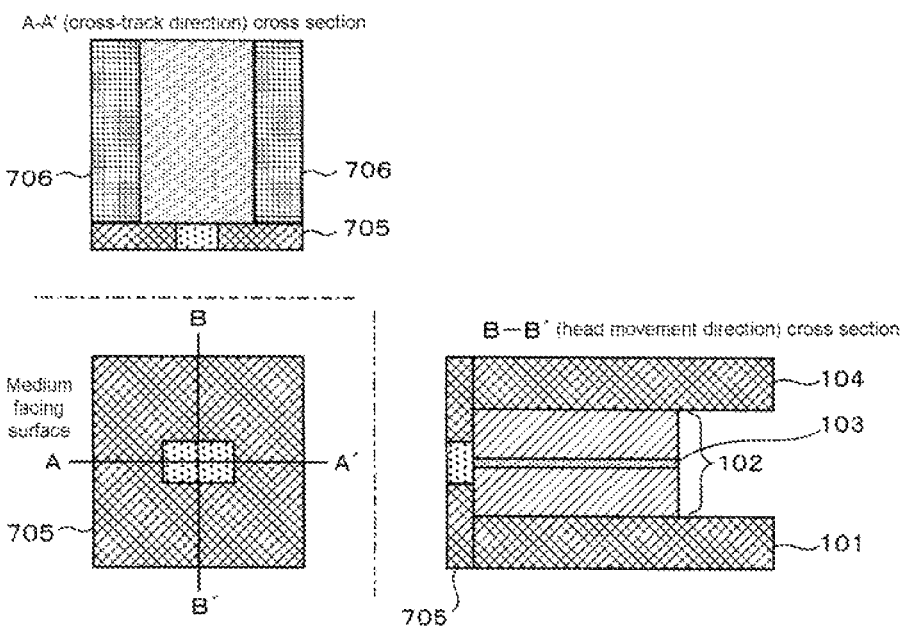

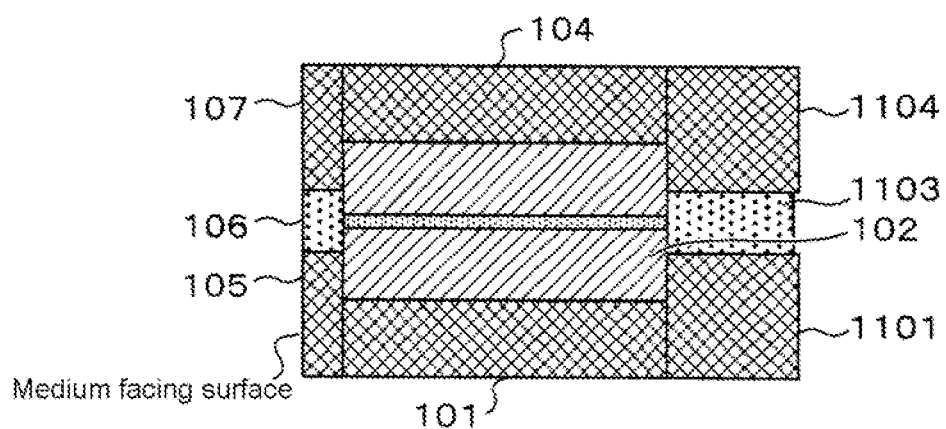

MAGNETORESISTIVE MAGNETIC HEAD HAVING A NON-MAGNETIC PART ON A MEDIUM FACING SURFACE SIDE OF THE SENSOR

RELATED APPLICATIONS

The present application claims priority to a Japanese Patent Application filed Oct. 14, 2009, under Appl. No. 2009-237296, which is incorporated herein by reference.

FIELD OF THE INVENTION

The present invention relates to a structure for achieving high resolution in a magnetoresistive magnetic head in a magnetic recording device, and systems thereof.

BACKGROUND OF THE INVENTION

There has been marked progress in the storage capacity of conventional magnetic recording devices. The size of recording and reproduction heads has been reduced over time and there have been improvements in the uniformity of media, among other advancements. In order to accurately read smaller-sized magnetic data recorded on media, improvements have continued into reducing noise and increasing resolution in magnetic heads.

In typical magnetic recording systems, magnetic data is converted to electrical signals using a magnetoresistive (MR) element, possibly of the spin-valve type. The basic structure of MR elements and of reproduction heads employed therein is shown in Jap. Unexamined Pat. Appl. Pub. No. H5-114119, for example. An MR element is typically disposed in such a way as to lie between magnetic shields which comprise a soft magnetic component. Furthermore, in systems utilizing MR elements, magnetic data is generally converted to electrical signals by the movement of the magnetization in the magnetization-free layer according to the magnetic field from the medium. In this process, magnetic domain structure in the magnetization-free layer causes large fluctuations in reproduction output and causes errors when reading the magnetic data. Therefore, a structure incorporating a magnetic field to control magnetic domain may be applied by an adjacent permanent magnet in order to prevent such errors.

One contributing factor which aids in determining the resolution of reproduction head structures of this kind is the magnetic shield gap, which is the distance between the magnetic shields on the medium facing side of the structure. Since the MR element is disposed between magnetic shields, current approaches reduce the thickness of the MR element in order to increase the resolution. However, the limit for reducing the thickness of the element is estimated to be around 20 nm, presently.

In order to break through this limit, a structure was proposed in FIG. 2B of Jap. Unexamined Pat. Appl. Pub. No. 2003-77107 in which only a magnetic flux guide is exposed on the medium facing surface. In this structure, the MR element is separated from the medium facing surface, and only a magnetic flux guide, which is connected to the MR element, is exposed up to the medium facing surface. This mitigates constraints in terms of the thickness of the MR element, and the shield gap at the medium facing surface can be freely set. Therefore, it is possible to improve the reproduction resolution in the head movement direction.

However, the structures disclosed in Jap. Unexamined Pat. Appl. Pub. Nos. H5-114119 and 2003-77107 carry a greater risk of error due to fluctuations in the reproduction output. This is because the magnetic field for controlling the magnetic domain is absorbed in the vicinity of the medium facing surface where the shield gap is narrow and therefore becomes weaker, and a magnetic domain structure is readily formed in the magnetic flux guide. In addition, it is only the reproduction resolution in the head movement direction which is improved with these structures, and it is not possible to improve the reproduction resolution in the direction away from tracks which are perpendicular to the head movement direction (the cross-track direction).

Therefore, a magnetic head design which alleviates the constraints and problems with prior art designs which allows for improvements in the reproduction resolution regardless of the thickness of the MR element and without increasing fluctuations in reproduction output would be very beneficial.

SUMMARY OF THE INVENTION

In one embodiment, a magnetoresistive magnetic head includes an upper magnetic shield, a lower magnetic shield, a magnetoresistive element formed between the upper magnetic shield and the lower magnetic shield; the magnetoresistive element having a magnetization-free layer formed therein, an upper magnetic shield restricting part formed on a medium facing surface side of the magnetoresistive element and the upper magnetic shield, a lower magnetic shield restricting part formed on the medium facing surface side of the magnetoresistive element and the lower magnetic shield, and a non-magnetic part formed between the upper and lower magnetic shield restricting parts on the medium facing surface side of the magnetoresistive element such that the magnetoresistive element is not exposed at the medium facing surface. The non-magnetic part is positioned such that a distance between the upper and lower magnetic shield restricting parts in a direction perpendicular to a plane of deposition is smaller than a distance between the upper and lower magnetic shields in the direction perpendicular to the plane of deposition near the medium facing surface.

In another embodiment, a system includes a magnetic recording medium, at least one magnetoresistive magnetic head as described herein for reading from and/or writing to the magnetic recording medium, a magnetic head slider for supporting the at least one magnetoresistive magnetic head, and a control unit coupled to the at least one magnetoresistive magnetic head for controlling operation of the at least one magnetoresistive magnetic head.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

BRIEF DESCRIPTION OF THE DRAWINGS

FIG. 6 shows a structure of the MR element part, according to one embodiment.

FIG. 7 shows a structure of the magnetoresistive magnetic head, according to one embodiment.

FIG. 11 shows a structure of a magnetoresistive magnetic head, according to one embodiment.

DETAILED DESCRIPTION

Figure 1:
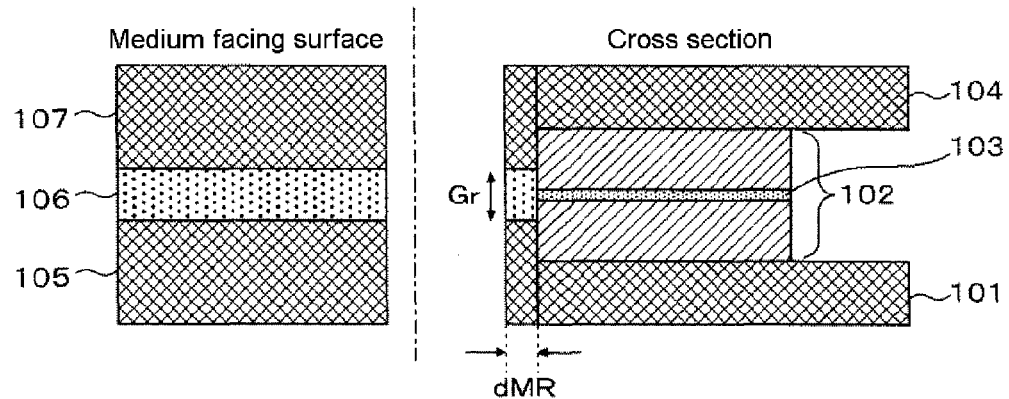
FIG. 1 shows a structure of a magnetoresistive magnetic head, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

In one general embodiment, a magnetoresistive magnetic head includes an upper magnetic shield, a lower magnetic shield, a magnetoresistive element formed between the upper magnetic shield and the lower magnetic shield, the magnetoresistive element having a magnetization-free layer formed therein, an upper magnetic shield restricting part formed on a medium facing surface side of the magnetoresistive element and the upper magnetic shield, a lower magnetic shield restricting part formed on the medium facing surface side of the magnetoresistive element and the lower magnetic shield, and a non-magnetic part formed between the upper and lower magnetic shield restricting parts on the medium facing surface side of the magnetoresistive element such that the magnetoresistive element is not exposed at the medium facing surface. The non-magnetic part is positioned such that a distance between the upper and lower magnetic shield restricting parts in a direction perpendicular to a plane of deposition is smaller than a distance between the upper and lower magnetic shields in the direction perpendicular to the plane of deposition near the medium facing surface.

In another general embodiment, a system includes a magnetic recording medium, at least one magnetoresistive magnetic head as described herein for reading from and/or writing to the magnetic recording medium, a magnetic head slider for supporting the at least one magnetoresistive magnetic head, and a control unit coupled to the at least one magnetoresistive magnetic head for controlling operation of the at least one magnetoresistive magnetic head.

Other aspects and advantages of the present invention will become apparent from the following detailed description, which, when taken in conjunction with the drawings, illustrate by way of example the principles of the invention.

As described above, with the magnetoresistive magnetic head disclosed in Jap. Unexamined Pat. Appl. Pub. No. H5-114119, it is not possible to narrow the magnetic shield gap, and the reproduction resolution cannot be improved. Furthermore, with the magnetoresistive magnetic head disclosed in Jap. Unexamined Pat. Appl. Pub. No. 2003-77107, only the magnetic flux guide is exposed at the medium facing surface, thereby making it possible to narrow the magnetic shield gap without reducing the thickness of the magnetoresistive (MR) element, and the reproduction resolution can be improved, but there are other problems, such as a magnetic domain structure that is readily formed in the magnetic flux guide and increased fluctuations in the reproduction output.

Therefore, embodiments have been devised in view of the problems outlined previously, and providing a magnetoresistive magnetic head which improves the reproduction resolution regardless of the thickness of the MR element and without increasing fluctuations in reproduction output is one goal of various embodiments presented herein.

In one embodiment, a magnetoresistive magnetic head includes an upper magnetic shield, a lower magnetic shield, a magnetoresistive element formed between the upper magnetic shield and the lower magnetic shield, the magnetoresistive element having a magnetization-free layer formed therein, an upper magnetic shield restricting part formed on a medium facing surface side of the magnetoresistive element and the upper magnetic shield, a lower magnetic shield restricting part formed on the medium facing surface side of the magnetoresistive element and the lower magnetic shield, and a non-magnetic part formed between the upper and lower magnetic shield restricting parts on the medium facing surface side of the magnetoresistive element comprising a gap between the restricting parts such that the magnetoresistive element is not exposed at the medium facing surface. The non-magnetic part is positioned such that a distance (gap) between the upper and lower magnetic shield restricting parts in a direction perpendicular to a plane of deposition is smaller than a distance between the upper and lower magnetic shields in the direction perpendicular to the plane of deposition near the medium facing surface.

In order to overcome the deficiencies of prior art magnetic heads, in some approaches, a magnetoresistive element may have a height in the plane of deposition perpendicular to the medium facing surface of about 1.2 times or less than the distance between the upper and lower magnetic shield restricting parts in the direction perpendicular to the plane of deposition.

In another approach, the thickness of the upper and lower shield restricting parts may steadily decrease toward the gap comprising the non-magnetic part.

Also, in one embodiment, a magnetic shield structure may be formed in the cross-track direction near the medium facing surface.

Furthermore, in one approach, the magnetoresistive magnetic head may have an upper magnetic shield capping part formed on an end opposite the medium surface facing side of the magnetic element and the upper magnetic shield, a lower magnetic shield capping part formed on an end opposite the medium surface facing side of the magnetic element and the lower magnetic shield, and a second non-magnetic part formed between the upper and lower magnetic shield capping parts on the end opposite the medium surface facing side of the magnetic element.

The magnetoresistive magnetic head according to one embodiment offers advantages in that it is possible to improve the reproduction resolution in the head movement direction and the cross-track direction regardless of the thickness of the MR element, and it is possible to suppress fluctuations in reproduction output in the process.

In one embodiment, the MR element may be separated from the medium facing surface, and magnetic shields may be formed between the MR element and the medium facing surface. The magnetic shields form a gap comprising a non-magnetic element near the magnetization-free layer of the MR element. This structure makes it possible to narrow the magnetic shield gap at the medium facing surface without reducing the thickness of the MR element, and thereby achieve high resolution.

FIG. 1 shows the medium facing surface and cross-sectional arrangement of the magnetic shields according to one embodiment. In FIG. 1, an MR element 102 is sandwiched between a lower magnetic shield 101 and an upper magnetic shield 104 comprising a soft magnetic component. The MR element 102 includes a magnetization-free layer 103 therein. A lower magnetic shield restricting part 105 and an upper magnetic shield restricting part 107 are provided on either side of a non-magnetic part 106 on the medium facing surface side of the MR element 102, and the magnetization-free layer 103 in the MR element is positioned at the gap comprising the non-magnetic part 106.

Figure 2:
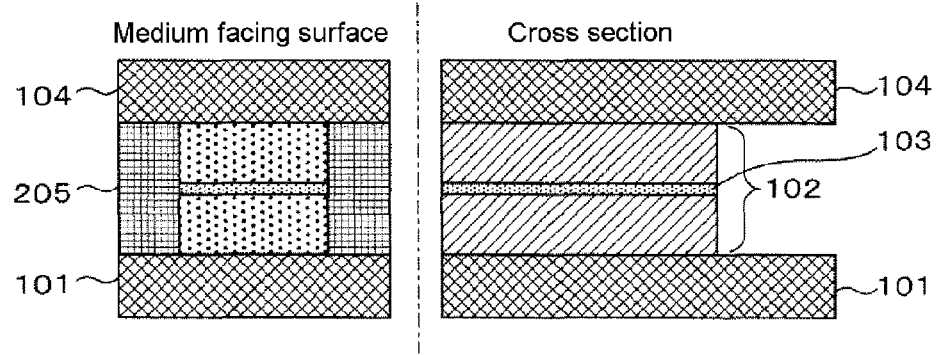
FIG. 2 shows a cross-sectional view of a conventional magnetoresistive magnetic head, according to the prior art.

A comparison with the conventional magnetoresistive magnetic head shown in FIG. 2 shows that in addition to the magnetic shields 101, 104 sandwiching the MR element part 103 in the conventional structure, the inventive structure also comprises a lower magnetic shield restricting pan 105 and an upper magnetic shield restricting part 197 for narrowing the magnetic shield opening at the medium facing surface. The structure in FIG. 1 makes it possible to achieve high resolution because the magnetic flux entering the MR element pan 103 from the medium is restricted to a narrower range.

General embodiments are described below. It should be noted that according to one-exemplary embodiment, a TMR (tunnel magnetoresistive) element which as shown in FIG. 6 is employed as the MR element, but it is equally feasible to employ a GMR (giant magnetoresistive) element or another similar element as would be apparent to one of skill in the art upon reading the present description.

In FIG. 6, the structure 607 includes an underlayer 601, an antiferromagnetic layer 602 serving as a pinning layer, a ferromagnetic fixed layer 603, a barrier layer 604, a free magnetization layer 605, and a cap layer 606, with the MR element 607 as a whole.

In this embodiment, a structure is shown in which the magnetic shield opening at the medium facing surface is narrowed, in addition to the conventional structure in which the magnetic shields are positioned sandwiching the MR element. This example is described with the aid of the schematic of the production process shown in FIG. 3. First of all, the lower magnetic shield layer 101, the MR element 102 having the magnetization-free layer 103, and the upper magnetic shield layer 104 may be produced in succession on an $Al_2O_3 TiC$ substrate, in one approach. An NiFe alloy may be used for the magnetic shield portions, according to one exemplary embodiment. A photoresist may then be applied and a resist pattern 305, such as that shown in (a) of FIG. 3, may be formed by photolithography.

Figure 3:
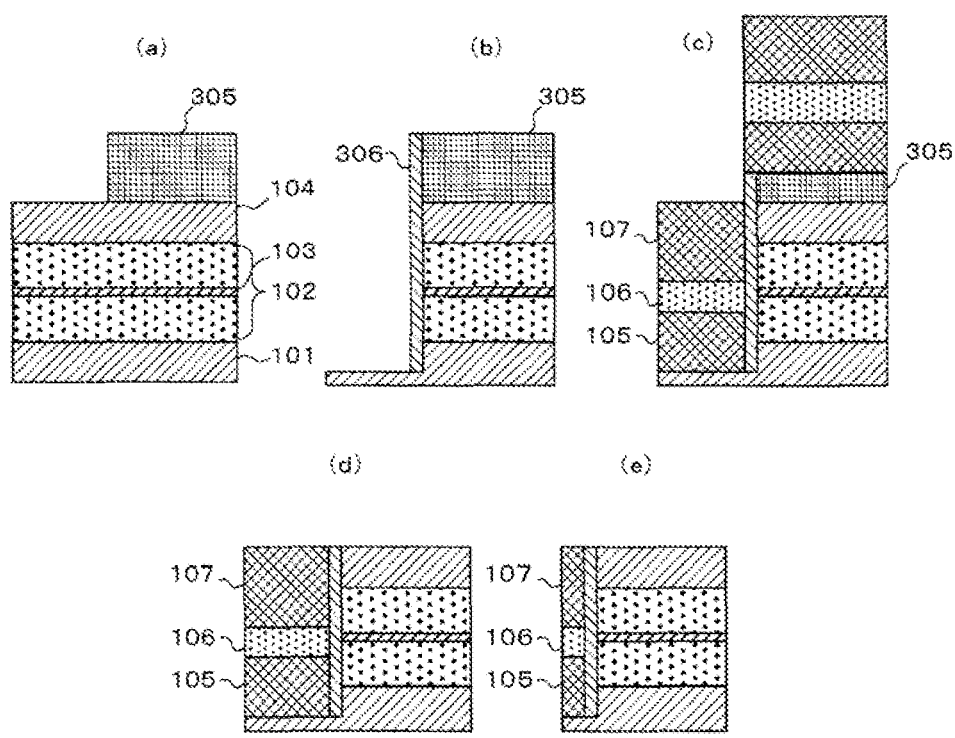
FIG. 3 shows a process for producing a magnetoresistive magnetic head, according to one embodiment.

After this, only the region where the resist pattern 305 is not present may be subjected to milling, as shown in (b) of FIG. 3, in one embodiment, and an insulating layer 306 made of a silicon oxide may be formed by depositing such a layer on the side surface thereof from an oblique direction with respect to the substrate surface. The lower magnetic shield restricting part 105, non-magnetic part 106 which may be made of a silicon oxide, and an upper magnetic shield, restricting part 107 are then deposited in succession, as shown in (c) of FIG. 3, according to one approach. Following this, the resist pattern 305 and the layers formed thereon may be removed by a lift-off process to give the shape shown in (d) of FIG. 3, in one embodiment. Grinding may be carried out in order to abrade the medium facing surface, and the structure shown in (e) of FIG. 3 is produced, in one embodiment.

The results of a comparison of the reproduction sensitivity of the magnetoresistive magnetic heads according to one exemplary embodiment and a comparative example are given below. The magnetoresistive magnetic heads which were used were produced under the same conditions except for the magnetoresistive magnetic head in the comparative example that had an MR element which was exposed at the medium facing surface and did not have magnetic shield restricting parts.

When fluctuations in the reproduction output for the magnetoresistive magnetic heads, according to one exemplary embodiment and the comparative example, were measured, it was seen in the comparative example that the output fluctuation was on the order of 5%, whereas in the exemplary embodiment it was on the order of 4%, meaning that there was less output fluctuation in the exemplary embodiment as compared to the comparative example, thereby indicating an improvement in performance over the prior art.

Figure 4:
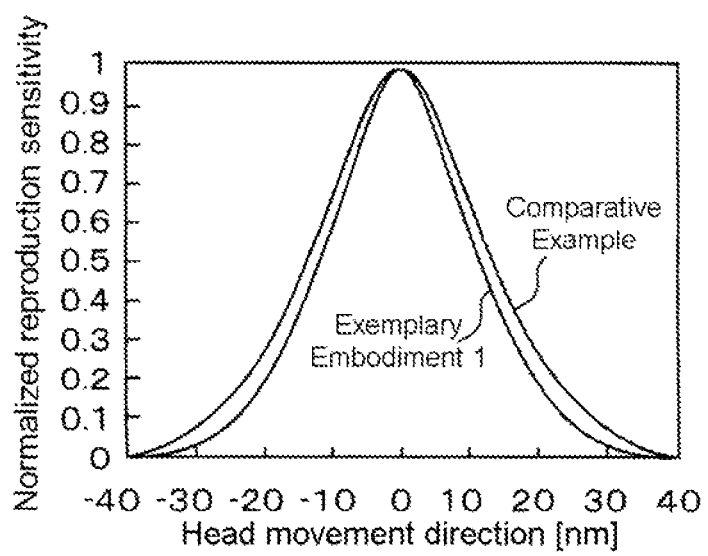
FIG. 4 shows a comparison between reproduction sensitivity, in one embodiment.

FIG. 4 shows the reproduction sensitivity in the head movement direction, according to one exemplary embodiment and the comparative example. The reproduction sensitivity is normalized at a value of 0 nm in the head movement direction. It can be confirmed from FIG. 4 that a sensitivity distribution with a narrower half-width than in the prior art is achieved.

Figure 5:
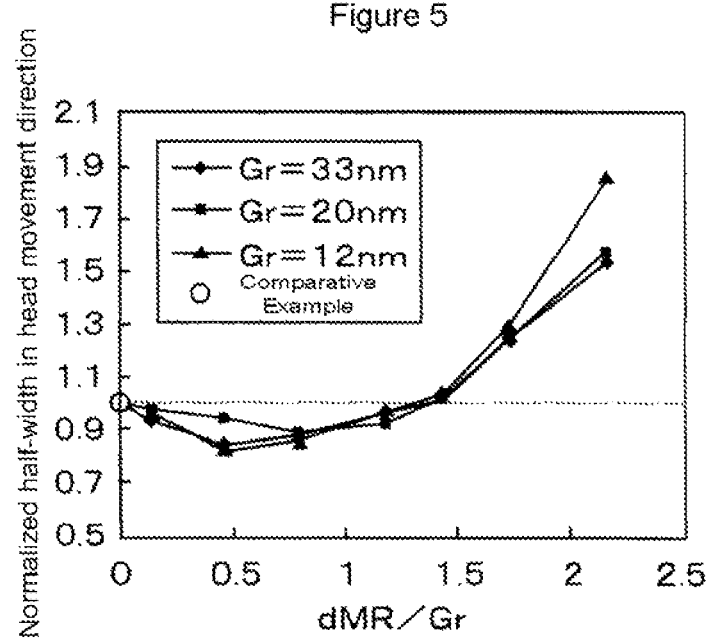
FIG. 5 shows a relationship between distance of the MR element from the medium facing surface, according to one embodiment.

FIG. 5 shows the way in which the half-width of the sensitivity distribution changes when the shield gap at the medium facing surface and the distance of the MR element from the medium facing surface are changed. The vertical axis represents the half-width of the sensitivity distribution in the head movement direction, and the horizontal axis shows the distance between the MR element and the medium facing surface (referred to below as "dMR") normalized by the magnetic shield gap (referred to below as "Gr") at the medium facing surface (see FIG. 1 with regard to Gr and dMR). It is clear from FIG. 5 that the resolution is determined in accordance with dMR/Gr under any conditions where Gr has been changed. In addition, when dMR/Gr is in a range of about 1.2 or less, the half-width of the sensitivity distribution becomes smaller and the resolution improves.

Accordingly, in several embodiments, it was possible to achieve higher resolution in the head movement direction and there was less fluctuation in the reproduction head output. Furthermore, a permanent magnet for controlling the magnetic domain was provided on both sides of the MR element 102 which was sandwiched by the upper shield 104 and lower shield 101, and it was possible to reduce output fluctuations in the magnetoresistive magnetic head by controlling the occurrence of a magnetic domain in the magnetization-free layer 103.

FIG. 7 shows the structure of another embodiment, which differs from the exemplary embodiment in that there is also a magnetic shield (referred to below as a "side shield") in the cross-track direction near the medium facing surface. A magnetic shield restricting part 705 which also has a magnetic shield in the cross-track direction is also included. It should be noted that a permanent magnet 706 for controlling the magnetic domain is shown as well.

Figure 8:
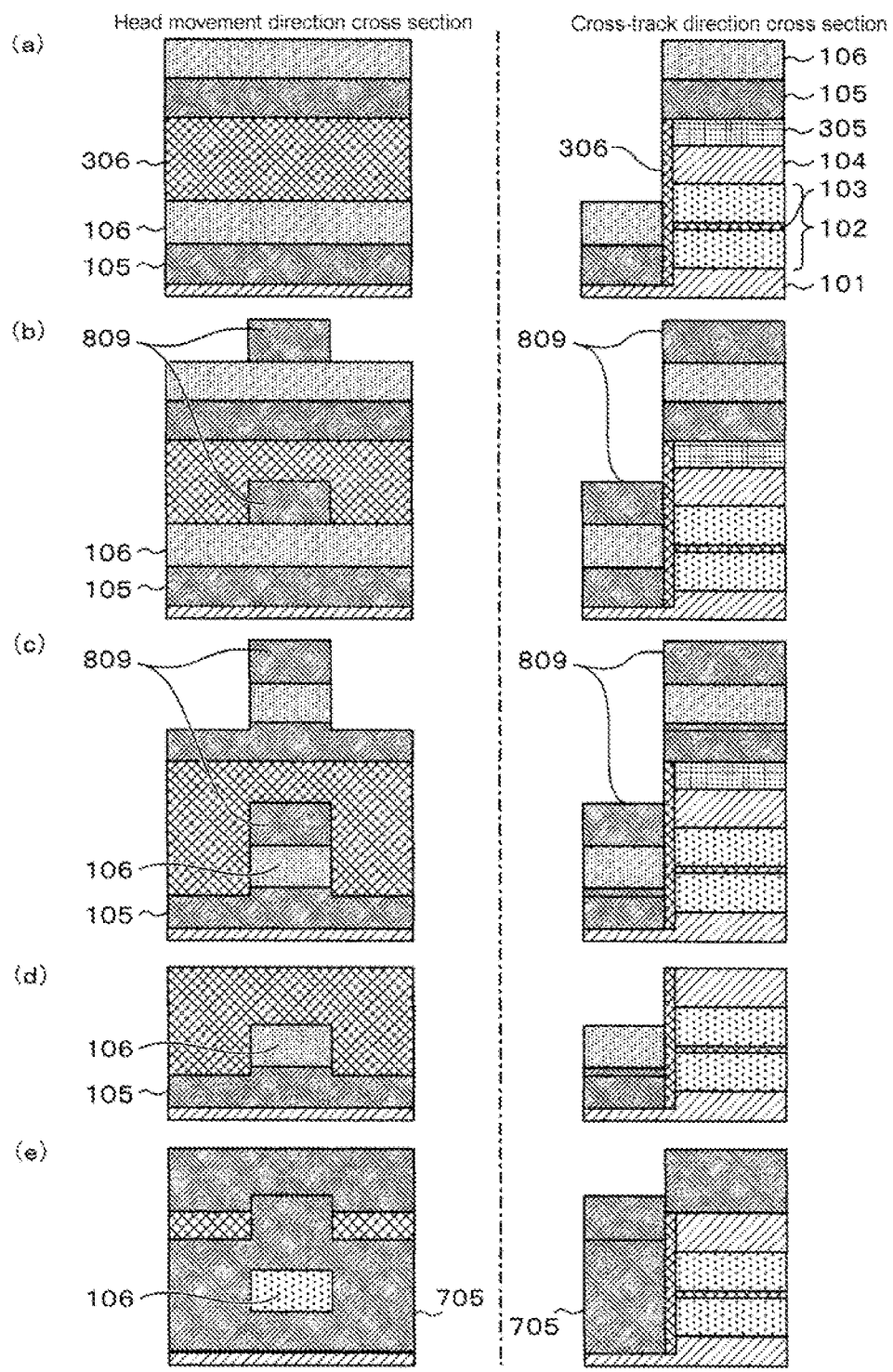
FIG. 8 shows a process for producing the magnetoresistive magnetic head, according to one embodiment.

The production process according to one exemplary embodiment is described with reference to FIG. 8. The steps prior to FIG. 8A have been omitted because they are the same as those in an exemplary embodiment. The magnetic shield layer 101, MR element 102, and upper magnetic shield layer 104 may be produced in succession on a substrate. The resist pattern 305 may be formed thereon by photolithography, and the region where the resist is not present may be subjected to milling, after which the insulating layer 306 may be formed on the side surface portions, according to various embodiments. The subsequent steps may be the same as in the previous exemplary embodiment, according to one approach.

After this, the lower magnetic shield restricting part 105 and non-magnetic part 106 may be deposited in succession as in FIG. 8A. Next, the resist pattern 809, shown in FIG. 8B may be formed, after which only the portion of the non-magnetic part 106, which is not covered by the resist, is subjected to milling, as in FIG. 8C.

In addition, the shape shown in FIG. 8D may be produced when the portions formed on top are removed by lift-off from the resist patterns 305 and 809. Finally, the upper magnetic shield restricting part and the side shield portion 705 may be deposited and the structure shown in FIG. 8E may be produced.

Figure 9:
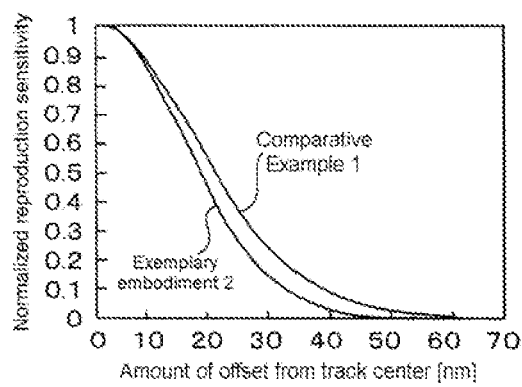
FIG. 9 shows a comparison between the reproduction sensitivity shapes according to one embodiment and a comparative example.

FIG. 9 shows the reproduction sensitivity in the cross-track direction according to one exemplary embodiment produced in the manner described above and a comparative example. This shows spreading of the reproduction sensitivity from the track center. The present exemplary embodiment showed a narrowing of around 12%, as a half-value, compared with the comparative example. Furthermore, the difference between the 25% width and 75% width of the normalized reproduction sensitivity which constitutes an indicator of the steepness of the spreading of the reproduction sensitivity was steep, decreasing by around 15% compared with the comparative example. Furthermore, the reproduction sensitivity in the head movement direction was substantially the same as that in a previous exemplary embodiment, and the sensitivity distribution obtained had a half-width around 15% narrower than in the case of the comparative example. This means that it was possible to increase the resolution in the cross-track direction and head movement direction using this exemplary embodiment.

Figure 10:
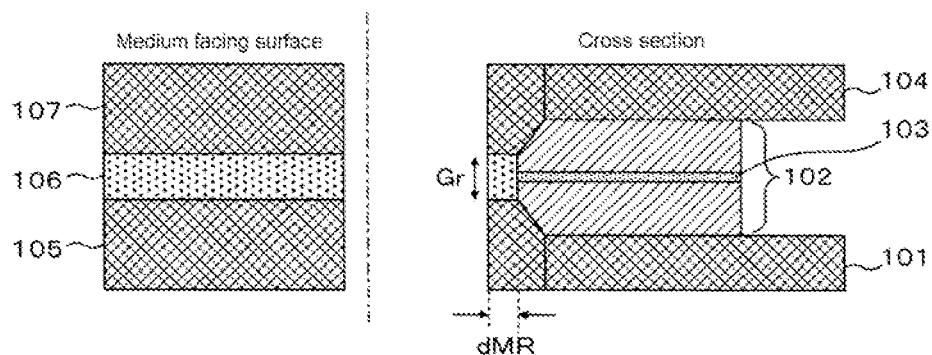
FIG. 10 shows a structure of a magnetoresistive magnetic head, according to one embodiment.

FIG. 10 shows a third exemplary embodiment. This exemplary embodiment differs from the other exemplary embodiments in terms of the shape of the magnetic shield restricting parts. In this exemplary embodiment, the thickness of the magnetic shield restricting parts is constant with respect to the medium facing surface, but in this exemplary embodiment the thickness of the magnetic shield restricting parts 105 and 107 steadily decreases from the lower magnetic shield 101 and the upper magnetic shield 104 towards the magnetization-free layer 103 within the MR element 102. This structure makes it possible to reduce the distance (dMR) from the medium facing surface to the MR element.

With this structure and according to one exemplary embodiment, the reproduction sensitivity distribution was substantially the same provided that the Gr and dMR shown in FIG. 10 were the same.

FIG. 11 shows a fourth exemplary embodiment. This exemplary embodiment differs from the other exemplary embodiments in terms of the shape of the magnetic shield on the side opposite the medium facing surface. The same production process as in the similar exemplary embodiments was used in order to produce the structure of this exemplary embodiment by subjecting the side opposite the medium facing surface to the same processing at the same time as the medium facing surface is produced. That is to say, a structure 1101 like the lower magnetic shield restricting part is produced at the same time as the lower magnetic shield restricting part 105, a non-magnetic layer 1103 between the structures like the shield restricting parts is produced at the same time as the non-magnetic part 106, and a structure 1104 like the upper shield restricting part is produced at the same time as the upper magnetic shield restricting part 107. The advantage of this structure is that insulation is maintained in the same way on the medium facing surface and the opposite side when insulation of the MR element is maintained on the medium facing surface. This makes it possible to reduce costs in the production process.

In another embodiment, a system includes a magnetic recording medium, at least one magnetoresistive magnetic head (as described herein according to various embodiments) for reading from and/or writing to the magnetic recording medium, a magnetic head slider for supporting the at least one magnetoresistive magnetic head, and a control unit coupled to the at least one magnetoresistive magnetic head for controlling operation of the at least one magnetoresistive magnetic head. Any type of recording medium may be used, such as a perpendicular recording medium. Also, the configuration of the system may be changed according to what one of skill in the art may determine is proper upon reading the present description.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetoresistive magnetic head, comprising:
   a medium facing surface;
   an upper magnetic shield;
   a lower magnetic shield;
   a magnetoresistive element formed between the upper magnetic shield and the lower magnetic shield, the magnetoresistive element having a magnetization-free layer formed therein;
   an upper magnetic shield restricting part formed on a medium facing surface side of the magnetoresistive element and the upper magnetic shield;
   a lower magnetic shield restricting part formed on the medium facing surface side of the magnetoresistive element and the lower magnetic shield; and
   a non-magnetic part formed between the upper and lower magnetic shield restricting parts on the medium facing surface side of the magnetoresistive element such that the magnetoresistive element is not exposed at the medium facing surface,
   wherein the non-magnetic part is positioned such that a distance between the upper and lower magnetic shield restricting parts in a direction perpendicular to a plane of deposition is smaller than a distance between the upper and lower magnetic shields in the direction perpendicular to the plane of deposition near the medium facing surface,
   wherein the non-magnetic part has side ends opposite one another and each extending from the upper magnetic shield restricting part to the lower magnetic shield restricting part, and
   wherein the non-magnetic part extends along the medium facing surface as a continuous layer from the upper magnetic shield restricting part to the lower magnetic shield restricting part at all positions therealong between the side ends of the non-magnetic part.

2. The magnetoresistive magnetic head as recited in claim 1, further comprising:
   a magnetic shield structure formed in a cross-track direction on either side of the magnetoresistive element; and
   a side magnetic shield restricting part formed in the cross-track direction on either side of the non-magnetic part on the medium facing surface.

3. The magnetoresistive magnetic head as recited in claim 2, further comprising:
an upper magnetic shield capping part formed on an end opposite the medium surface facing side of the magnetoresistive element and the upper magnetic shield;
a lower magnetic shield capping part formed on an end opposite the medium surface facing side of the magnetoresistive element and the lower magnetic shield; and
a second non-magnetic part extending continuously between the upper and lower magnetic shield capping parts on the end opposite the medium surface facing side of the magnetoresistive element, wherein the second non-magnetic part is uninterrupted by any other structure.

4. The magnetoresistive magnetic head as recited in claim 1, wherein the magnetoresistive element has a height in the plane of deposition perpendicular to the medium facing surface of about 1.2 times or less than the distance between the upper and lower magnetic shield restricting parts in the direction perpendicular to the plane of deposition.

5. The magnetoresistive magnetic head as recited in claim 4, further comprising:
a magnetic shield structure formed in a cross-track direction on either side of the magnetoresistive element; and
a side magnetic shield restricting part formed in the cross-track direction on either side of the non-magnetic part on the medium facing surface.

6. The magnetoresistive magnetic head as recited in claim 4, further comprising:
an upper magnetic shield capping part formed on an end opposite the medium surface facing side of the magnetoresistive element and the upper magnetic shield;
a lower magnetic shield capping part formed on an end opposite the medium surface facing side of the magnetoresistive element and the lower magnetic shield; and
a second non-magnetic part formed extending continuously between the upper and lower magnetic shield capping parts on the end opposite the medium surface facing side of the magnetoresistive element, wherein the second non-magnetic part is uninterrupted by any other structure.

7. The magnetoresistive magnetic head as recited in claim 4, wherein a thickness in a film deposition direction of the upper and lower shield restricting parts steadily decreases from points thereof that are about aligned with a rear end of the non-magnetic part in the film thickness direction toward points thereof farther from the medium facing surface, wherein the thicknesses of the upper and lower shield restricting parts at the points about aligned with the rear end of the non-magnetic part are greater than the thicknesses of the upper and lower shield restricting parts at any points farther from the medium facing surface than the points about aligned with the rear end of the non-magnetic part in a direction perpendicular with the medium facing surface.

8. The magnetoresistive magnetic head as recited in claim 7, further comprising:
an upper magnetic shield capping part formed on an end opposite the medium surface facing side of the magnetoresistive element and the upper magnetic shield;
a lower magnetic shield capping part formed on an end opposite the medium surface facing side of the magnetoresistive element and the lower magnetic shield; and
a second non-magnetic part formed extending continuously between the upper and lower magnetic shield capping parts on the end opposite the medium surface facing side of the magnetoresistive element, wherein the second non-magnetic part is uninterrupted by any other structure.

9. The magnetoresistive magnetic head as recited in claim 7, further comprising:
a magnetic shield structure formed in a cross-track direction on either side of the magnetoresistive element; and
a side magnetic shield restricting part formed in the cross-track direction on either side of the non-magnetic part on the medium facing surface.

10. The magnetoresistive magnetic head as recited in claim 9, further comprising:
an upper magnetic shield capping part formed on an end opposite the medium surface facing side of the magnetoresistive element and the upper magnetic shield;
a lower magnetic shield capping part formed on an end opposite the medium surface facing side of the magnetoresistive element and the lower magnetic shield; and
a second non-magnetic part formed extending continuously between the upper and lower magnetic shield capping parts on the end opposite the medium surface facing side of the magnetoresistive element, wherein the second non-magnetic part is uninterrupted by any other structure.

11. The magnetoresistive magnetic head as recited in claim 1, wherein the distance between the upper and lower magnetic shield restricting parts in the direction perpendicular to the plane of deposition near the medium facing surface is smaller than a thickness of the magnetoresistive element in a film deposition direction.

12. The magnetoresistive magnetic head as recited in claim 1, wherein a thickness in a film deposition direction of the upper and lower shield restricting parts steadily decreases from points thereof that are about aligned with a rear end of the non-magnetic part in the film thickness direction toward points thereof farther from the medium facing surface, wherein the thicknesses of the upper and lower shield restricting parts at the points about aligned with the rear end of the non-magnetic part are greater than the thicknesses of the upper and lower shield restricting parts at any points farther from the medium facing surface than the points about aligned with the rear end of the non-magnetic part in a direction perpendicular with the medium facing surface.

13. The magnetoresistive magnetic head as recited in claim 12, further comprising:
an upper magnetic shield capping part formed on an end opposite the medium surface facing side of the magnetoresistive element and the upper magnetic shield;
a lower magnetic shield capping part formed on an end opposite the medium surface facing side of the magnetoresistive element and the lower magnetic shield; and
a second non-magnetic part formed extending continuously between the upper and lower magnetic shield capping parts on the end opposite the medium surface facing side of the magnetoresistive element, wherein the second non-magnetic part is uninterrupted by any other structure.

14. The magnetoresistive magnetic head as recited in claim 12, further comprising:
a magnetic shield structure formed in a cross-track direction on either side of the magnetoresistive element; and
a side magnetic shield restricting part formed in the cross-track direction on either side of the non-magnetic part on the medium facing surface.

15. The magnetoresistive magnetic head as recited in claim 1, further comprising:

an upper magnetic shield capping part formed on an end opposite the medium surface facing side of the magnetoresistive element and the upper magnetic shield;

a lower magnetic shield capping part formed on an end opposite the medium surface facing side of the magnetoresistive element and the lower magnetic shield; and a second non-magnetic part formed extending continuously between the upper and lower magnetic shield capping parts on the end opposite the medium surface facing side of the magnetoresistive element, wherein the second non-magnetic part is uninterrupted by any other structure.

16. A system, comprising:

a magnetic recording medium;

at least one magnetoresistive magnetic head as recited in claim 1 for reading from and/or writing to the magnetic recording medium;

a magnetic head slider for supporting the at least one magnetoresistive magnetic head; and a control unit coupled to the at least one magnetoresistive magnetic head for controlling operation of the at least one magnetoresistive magnetic head.

17. The magnetoresistive magnetic head as recited in claim 1, wherein the non-magnetic part is a single uninterrupted layer.

18. The magnetoresistive magnetic head as recited in claim 1, wherein the non-magnetic part is configured such that a magnetic flux guide is not positioned adjacent the magnetization-free layer.

19. The magnetoresistive magnetic head as recited in claim 1, further comprising an insulating layer positioned between, on a medium facing side of the insulating layer, the non-magnetic part and the upper and lower magnetic shield restricting parts, and on a side opposite the medium facing side of the insulating layer, the medium facing surface side of the magnetoresistive element.

20. A magnetoresistive magnetic head comprising:

a medium facing surface;

an upper magnetic shield;

a lower magnetic shield;

a magnetoresistive element formed between the upper magnetic shield and the lower magnetic shield, the magnetoresistive element having a magnetization-free layer formed therein;

an upper magnetic shield restricting part formed on a medium facing surface side of the magnetoresistive element and the upper magnetic shield;

a lower magnetic shield restricting part formed on the medium facing surface side of the magnetoresistive element and the lower magnetic shield; and a non-magnetic part formed between the upper and lower magnetic shield restricting parts on the medium facing surface side of the magnetoresistive element such that the magnetoresistive element is not exposed at the medium facing surface, wherein the non-magnetic part has side ends opposite one another and each extending from the upper magnetic shield restricting part to the lower magnetic shield restricting part, and wherein the non-magnetic part extends along the medium facing surface as a continuous layer from the upper magnetic shield restricting part to the lower magnetic shield restricting part at all positions therealong between the side ends of the non-magnetic part;

a magnetic shield structure formed in a cross-track direction on either side of the magnetoresistive element;

a side magnetic shield restricting part formed in the cross-track direction on either side of the non-magnetic part on the medium facing surface;

an upper magnetic shield capping part formed on an end opposite the medium surface facing side of the magnetoresistive element and the upper magnetic shield;

a lower magnetic shield capping part formed on an end opposite the medium surface facing side of the magnetoresistive element and the lower magnetic shield; and a second non-magnetic part formed extending continuously between the upper and lower magnetic shield capping parts on the end opposite the medium surface facing side of the magnetoresistive element, wherein the second non-magnetic part is uninterrupted by any other structure, wherein the non-magnetic part is positioned such that a distance between the upper and lower magnetic shield restricting parts in a direction perpendicular to a plane of deposition is smaller than a distance between the upper and lower magnetic shields in the direction perpendicular to the plane of deposition near the medium facing surface, and wherein a thickness in a film deposition direction of the upper and lower shield restricting parts steadily decreases from points thereof that are about aligned with a rear end of the non-magnetic part in the film thickness direction toward points thereof farther from the medium facing surface, wherein the thicknesses of the upper and lower shield restricting parts at the points about aligned with the rear end of the non-magnetic part are greater than the thicknesses of the upper and lower shield restricting parts at any points farther from the medium facing surface than the points about aligned with the rear end of the non-magnetic part in a direction perpendicular with the medium facing surface.

* * * * *

UNITED STATES PATENT AND TRADEMARK OFFICE
CERTIFICATE OF CORRECTION

PATENT NO. : 8,514,526 B2
APPLICATION NO. : 12/904954
DATED : August 20, 2013
INVENTOR(S) : Ito et al.

It is certified that error appears in the above-identified patent and that said Letters Patent is hereby corrected as shown below:

In the specification:

col. 2, line 22 replace "shield;" with --shield,--;

col. 5, line 21 replace "pan" with --part--;

col. 5, line 22 replace "197" with --107--;

col. 5, line 25 replace "pan" with --part--;

col. 5, line 28 replace "one-exemplary" with --one exemplary--.

Signed and Sealed this
Eighth Day of October, 2013

Teresa Stanek Rea
*Deputy Director of the United States Patent and Trademark Office*